Oct. 1, 1968  H. E. BADE  3,403,600
PNEUMATIC FASTENING MACHINES FOR STAPLES, NAILS
OR THE LIKE FASTENERS
Filed May 5, 1966  2 Sheets-Sheet 2
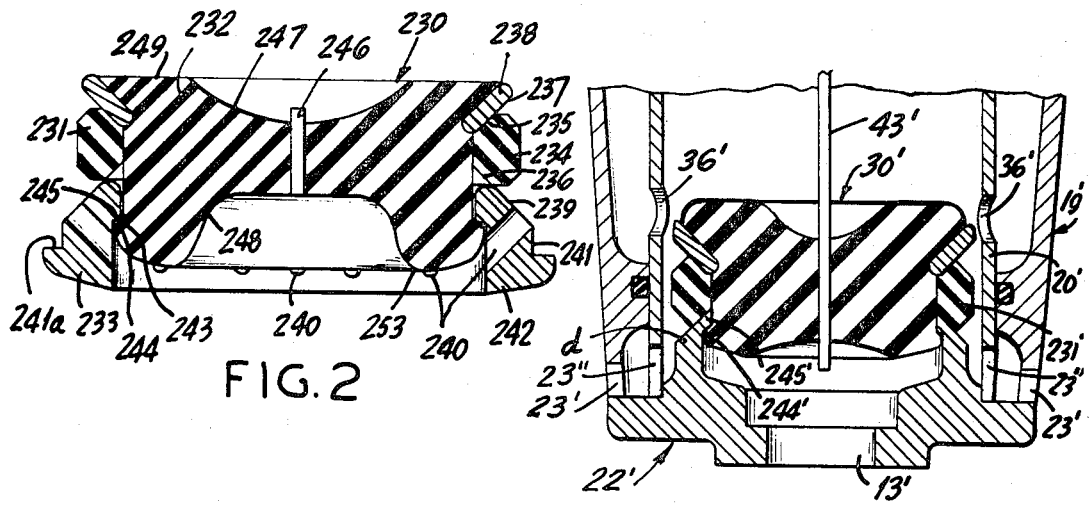
FIG. 2
FIG. 4
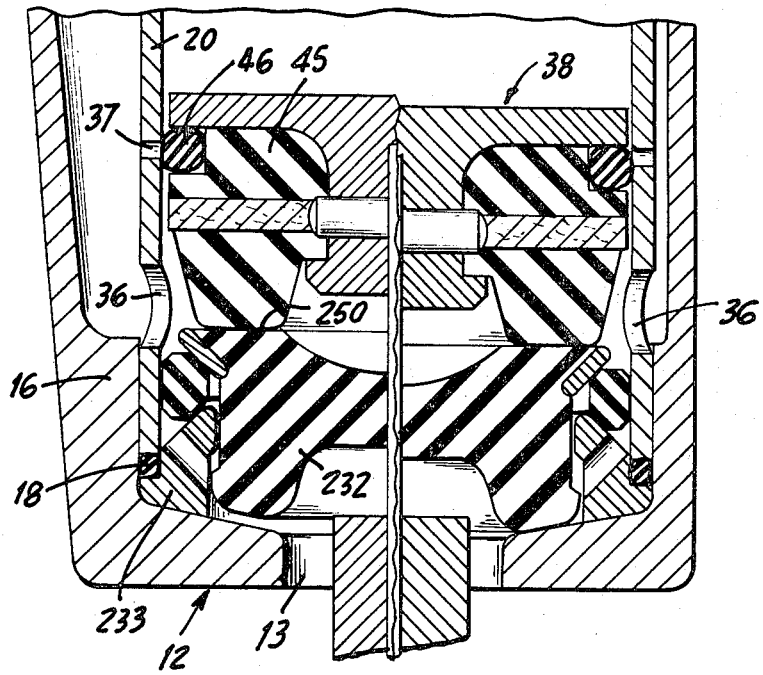
FIG. 3
INVENTOR.
HEINZ E. BADE
BY
J. B. Felshin
ATTORNEY.

United States Patent Office 3,403,600
Patented Oct. 1, 1968

3,403,600
PNEUMATIC FASTENING MACHINES FOR STAPLES, NAILS OR THE LIKE FASTENERS
Heinz Emil Bade, Hamburg-Garstedt, Germany, assignor to Joh. Friedrich Behrens, Ahrensburg, Holstein, Germany, a partnership
Filed May 5, 1966, Ser. No. 547,811
Claims priority, application Germany, June 18, 1965, B 82,454
15 Claims. (Cl. 91—409)

ABSTRACT OF THE DISCLOSURE

This pneumatic fastening machine is operated by compressed air controlled by a trigger actuated valve. The machine comprises a cylinder open at its lower end. A piston within the cylinder is adapted to move axially from the upper end of the cylinder to the lower end thereof. A driver member has its upper end fixed to the piston and extends downwardly therefrom. Means is provided it supply fluid under pressure to the upper end of the piston to cause the piston to move downwardly through a driving stroke for driving a stapler or the like. At the lower end of the cylinder there is a valve means disposed below the piston. This valve means comprises a valve member formed of resilient material with an opening slidably receiving the drive member. An elastic sealing ring is interposed between said valve member and the inner surface of the cylinder. The sealing ring is made of elastic material and is normally contracted and in spaced relation to the cylinder to provide a passage between the ring and the cylinder. The valve means has an inclined surface to press the sealing ring into engagement with an inclined surface of a fixed member at the bottom of the cylinder. This action causes the elastic ring to expand and be pressed against the inner surface of the cylinder when the piston moves down and moves the valve member axially downwardly at the end of the driving stroke.

---

This invention relates to penumatic fastening machines for staples, nails or the like fasteners.

This application pertains to improvements to the type of machine disclosed in my co-pending application Ser. No. 469,993, filed July 7, 1965 entitled "Pneumatic Fastening Machines for Staples, Nails or the Like Fasteners."

In this type of fastening machine, the driving piston must have considerable kinetic energy. Consequently, an unobstructed discharge of the air displaced by the driving piston during the driving operation must be obtained if relatively large energy losses due to compression or throttling of air under the piston, are to be avoided.

With such machines, another difficulty resides in that the return of the piston on completion of the driving operation is to be performed in such a manner that no obstruction is caused by the return elements or by the other means taken to return the piston. With the prior art machines the piston return is effected either by spring force or compressed air bias on the piston front face. In the case of mechanical return of the piston by spring force, the return springs are tensioned by the piston movement during its driving stroke, said springs returning their spring energy to the piston as soon as the driving compressed air bias on the piston is interrupted. However, it is obvious that the energy imposed on the return springs by the piston during the drive-in operation leads to a reduction in the drive-in force.

In some prior machines, the piston is returned by a compressed air bias effected on the piston front face, by introducing the air displaced by the piston during the drive-in stroke into a pressure chamber and compressing it there by way of the reduction in volume effected by the piston forward stroke. At the end of the drive-in stroke, after interruption of the compressed air bias effective on the piston, this compressed air leaves the pressure chamber and biases the piston whereby the piston is returned to its starting position. Here as well as with springs, the compression effort to compress the return stroke air is performed by the drive-in piston during the driving stroke which results in an undesired reduction of the driving force.

With other machines, the compressed air bias on completion of the drive-in stroke is shifted from the one side of the piston to the other. Although in so doing the return energy is not taken from the piston at the expense of the drive-in force, additional control elements are necessary which complicate the construction. Besides, considerable difficulties are encountered when arranging for sufficiently large outflow cross sectional areas for the air displaced by the piston during the piston forward stroke, and closing them quickly and safely on completion of the drive-in stroke so that the compressed air provided for the return stroke of the piston cannot escape from the cylinder without effecting return movement of the piston. Control valves employed so far for this purpose have not worked satisfactorily especially as to their life requirements.

Therefore, it is an object of the present invention to provide a control valve which provides relatively large cross sectional areas for the air displaced from the working cylinder during the drive-in operation by the drive-in piston and which, at the end of the drive-in operation, secures a quick and safe closure of these flow cross sectional areas.

As another object, the control valve to be provided in accordance with the invention acts as a dampening member to absorb the kinetic energy still inherent in the piston on completion of its drive-in stroke.

The invention starts from a pneumatically operated drive-in apparatus to drive-in fastening means, for instance, nails, staples etc. of the type disclosed in my said co-pending application, in which the working cylinder accommodating the axially displaceable piston is provided with a control valve at its end opposite the compressed air biased end to control the passage cross sectional areas for the discharge of the air displaced by the drive-in piston during the drive-in stroke.

Another object of this invention is to provide a control valve of the character described which comprises a radially expansible sealing element arranged concentrically within the cylinder, said element when in the expanded condition sealingly engaging the cylinder inner wall.

Preferably, the sealing element is a radially expansible spreading ring with conical ring faces and arranged between other cooperating conical ring faces which are capable of axial displacement with respect to each other and cooperating with the conical faces of the spreading ring. The spreading ring may concentrically encompass an axially displaceably supported valve member preferably provided with a conical ring face.

According to another feature of the invention, the valve member may be mounted so as to be axially displaceable within a guide ring having a conical surface arranged opposite the conical surface of the valve member and facing it, while being fixed at the bottom end of the working cylinder, with the spreading ring arranged between the conical faces of the valve member and the guide ring. The guide ring concentrically encompassing the valve member may be provided with radially inwardly directed passage bores for the passage of the air displaced by the piston during the drive-in stroke.

According to another form of the invention, the guide ring may be designed as part of the bottom of the housing.

The valve member may be provided with contact surfaces, with corresponding contact surfaces of the piston striking thereon at the end of the drive-in stroke.

In the presently preferred embodiment of the invention, the position of the conical surfaces of the valve member, the guide ring, and the spreading ring are related to each other such that the spreading ring sealingly abuts the inner wall of the working cylinder before a communication bore provided between the working cylinder and a pressure chamber surrounding said working cylinder or associated therewith, respectively, is released by the control edge or sealing ring of the drive-in piston, to bias said chamber with pressure. The axial length of the valve member advantageously may be such that with the spreading ring closely abutting the inner wall of the working cylinder, the distance of the valve body underside from the housing bottom is equal to the axial overlap of the communication bore to the annular space in this position of the piston.

The valve body preferably consists of elastic material, for instance polyurethane and, after axial displacement of the piston, may be deformed to such an extent that its underside abuts the bottom of the housing, whereby on the one hand the communication bore between the cylinder inner space and the additional pressure chamber is released and on the other hand the residual kinetic energy of the piston is absorbed.

The advantage of the control valve arrangement in accordance with the invention over the prior art arrangement is in that in addition to a safe control of the passage cross sectional areas for the air displaced by the drive-in piston during the drive-in stroke, also an effective attenuation member to accommodate the residual kinetic energy still inherent to the drive-in piston at the end of the drive-in stroke is provided. Because of the radially deformable spreading ring, with the valve in its open position, relatively wide cross sectional areas are available as passages so that the air displaced by the drive-in piston during the drive-in operation may be discharged without any material compression or throttling. Since with the valve arrangement in accordance with the invention, an annular cross sectional area having an outside diameter equal to that of the working cylinder is provided, a relatively small width of annular gap will suffice to obtain a relatively large exit passage. Consequently, to close the valve, only a small radial expansion of the spreading ring is required. The axial force required to radially expand the spreading ring is created in the valve member by the piston front face when it abuts corresponding contact surfaces of the valve member. Owing to this axial displacement the spreading ring expands radially to sealingly abut the cylinder inner wall. The residual kinetic energy then still inherent in the piston causes a deformation of the valve member until the underside thereof abuts the bottom of the housing.

When this occurs, an overflow passage is opened which communicates the cylinder inner space above the piston with a pressure space concentrically surrounding the working cylinder for essentially the entire length thereof as an annular space. Said annular space is also connected with the cylinder inner space through another overflow passage immediately above the spreading ring when it sealingly engages the cylinder inner wall. The annular space is supplied with compressed air due to the opening of the first communication bore. As the release of said communication bore is due solely to the elastic deformation of the valve member, said compressed air bias of the cylinder space is only a momentary one, because immediately upon dissipation of the residual kinetic energy in the piston the valve member elastically returns from its deformed position and axially displaces the working piston to such an extent that the communication bore between the cylinder inner space and the annular space which is now biased with compressed air, is closed. Thus, the compressed air present in the annular space may now overflow only through the second communication bore between the annular space and the cylinder inner space. This bore is disposed immediately above the sealing surface of the spreading ring so that the front surface of the drive-in piston is biased by said compressed air overflow, because of which the piston returns to its starting position.

To obtain the return movement of the piston, only a very short bias on the piston front face is needed. Owing to the relief of the valve member which is caused by the piston return movement, the spreading ring contracts to its open position from its sealed position, and the cylinder inner space below the drive-in piston is relieved from pressure immediately upon the initiation of the piston return movement.

Other objects of this invention will in part be obvious and in part hereinafter pointed out.

The invention accordingly consists in the features of construction, combinations of elements, and arrangement of parts which will be exemplified in the construction hereinafter described, and of which the scope of invention will be indicated in the following claims.

In the accompanying drawing, in which are shown various illustrative embodiments of this invention:

FIG. 2 is a vertical cross sectional view of the control valve assembly with the spreading ring in unexpanded condition;

FIG. 3 is an enlarged split view of the lower portion of the apparatus shown in FIG. 1, showing the deformed and nondeformed conditions of the valve member; and FIG. 4 is an enlarged view similar to the lower portion of FIG. 1 but showing a modified construction.

Figure 1:
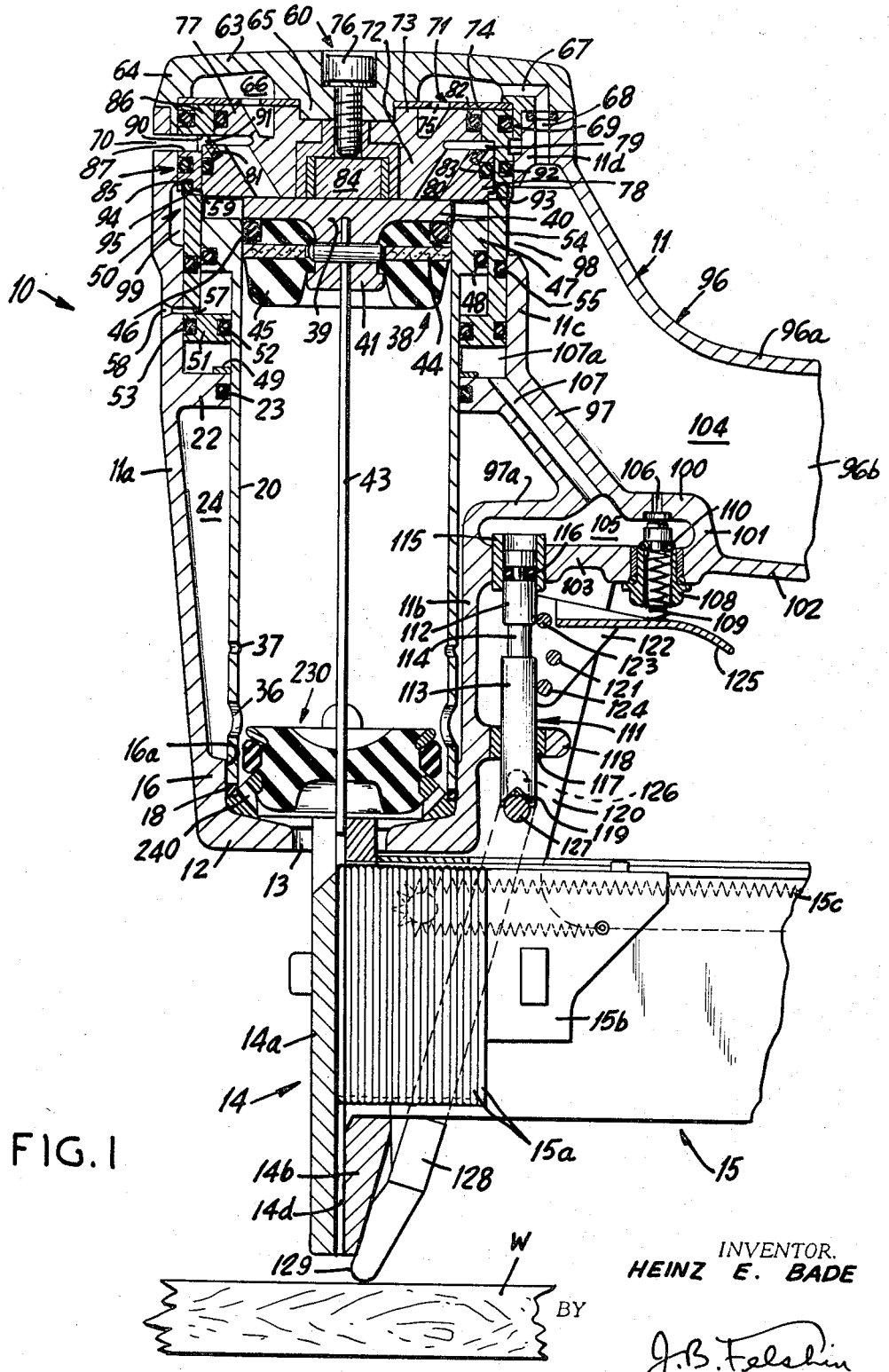
FIG. 1 is a vertical, longitudinal section through a machine embodying the invention.

Referring now in detail to the drawings, 10 designates a machine embodying the invention. Machine 10 comprises a housing 11 provided with a front, vertical housing portion 11a having a bottom wall 12. Wall 12 is formed with a central opening 13. Secured to the housing 11 in any suitable manner, not shown, is a fastener guide assembly 14, to which is secured a fastener magazine assembly 15, both of which are conventional. Fasteners 15a are pressed by pusher 15b toward the rear surface of front generally flat plate 14a of said assembly 14 by spring 15c. A rear plate 14b of said assembly 14 forms a passage with plate 14a. The upper ends of plates 14a, 14b project up into opening 13. The lower ends of said plates form a passage 14d for a driven fastener 15a.

Mounted inside housing portion 11a, above wall 12, and within a thickened portion 16 at the lower end of said housing portion adjacent wall 12, formed with a cylindrical bore 16a, is a control valve assembly 230, see FIG. 2.

The control valve assembly 230 shown in FIG. 2 basically consists of the spreading ring 231, the valve member 232, and the guiding ring 233. The spreading ring 231 has a cross sectional shape in the form of a wedge tapered on both sides with conical surfaces 235, 236, and concentrically surrounds the valve member 232 relatively loosely so as to have radial play. The valve member 232 is provided with a conical surface 237, and the guide ring 233 comprises a conical surface 239. The guide ring 233 also concentrically encompasses the valve member 232 with radial play and is retained by means of an annular bead 244 extending all around the lower end of the valve member 232 and comprising an edge 243 cooperating with the edge 245 of the guide ring 233. The spreading ring 231 is arranged between the conical surface 237 of the valve member 232 formed by an inserted metal ring 238, and the conical surfaces 239 of the guide ring 233. As a result of the radial play between the guide ring 233 and the valve member 232, said valve member 232 is capable of being axially displaced. With such axial displacement of the valve member with respect to the guide ring 233, the spreading ring is radially tensioned by the cooperation of the conical surfaces 235, 237 and 236, 239, and consequently is expanded, compare FIGS. 2 and 3. The axial displacement of the valve member with respect to the guide ring is brought about by the impingement of the piston on the contact surfaces 249 of the valve member. The valve member is provided with a guiding slot 246 to guide the driving blade and is provided with recesses 247, 248 in the center. The guide ring 233 is provided with bores 240 extending radially inwardly and downwardly from the conical surface 239. The guide ring 233 in addition comprises an extension surface 247 and ledge 241a to support the lower end of the working cylinder, and an abutment surface 242 adapted to fit the inner contour of the housing bottom 12.

The valve member 232 and the spreading ring 231 are made of a high grade elastic, plastic material, for instance polyurethane. The guide ring 233, and the metal ring 238 forming conical surface 237 may be formed as turned steel parts. Owing to the cooperation between the oblique surfaces 235, 236 of the spreading ring 231 and the steel surfaces 237, 239, favorable frictional relationships are secured for the radial expansion of the spreading ring. Because of the favourable deforming properties of the material of the valve member it is possible to push the metal ring 238, the spreading ring 231 and then the guide ring 233 over the annular bead 244 at the lower end of the valve member when the valve member is slightly tensioned radially. After these structural members have been pushed on, owing to the cooperation of the edges 243, 245 at the annular bead 244 of the valve member 232 and the inner surface of the guide ring 233, respectively, a security is afforded against return movement of the guide ring.

A stationary vertical cylinder 20 is positioned within housing portion 11a, and has its lower end 21 sealingly received between wall 241 and ledge 241a and the inner cylindrical surface 16a of the thickened portion 16, with a gasket 18 interposed therebetween. Housing portion 11a is formed with an inwardly extending annular flange 22, the inner annular surface of which is of slightly larger diameter than the outer diameter of cylinder 20. Any suitable sealing means, here shown as an "O" ring 23, carried by flange 22 sealingly contacts the outer surface of the cylinder to form an air tight seal therewith. Portion 11a has a wall 11b surrounding cylinder 20 and spaced therefrom, between flange 22 and thickened portion 16 to form a chamber 24. Chamber 24 is sealed by "O" ring 23. The function of chamber 24 will appear hereinafter.

Cylinder 20, at about the upper surface 249 of valve member 232 is formed with one or more co-level openings 36 joining the space inside the cylinder with the chamber 24. In spaced relation above openings 36, the cylinder 20 is formed with one or more co-level openings 37. The spacing of openings 36, 37 and the function of these openings 36, 37 will be explained hereinafter.

Reciprocally mounted within the cylinder 20 is a piston, generally designated by numeral 38. Piston 38 comprises a top body portion 39, which is preferably made of steel or other material which will be attracted to a magnet. Body portion 39 comprises an upper annular flange portion 40 which is of somewhat smaller diameter than the inside diameter of cylinder 20. The upper surface of body portion 39, may be provided with shallow grooves (not shown) to facilitate seepage of the working fluid under pressure above the piston, in the manner more clearly described hereinafter. Body portion 39 has a central portion 41 projecting downwardly. Portion 41 is formed with a suitable slot to receive the upper end of a driver blade 43. Surrounding portion 41, and extending up to the undersurface of flange 40, and projecting below the undersurface of portion 41, is a dampening 45, portion 41 and driver blade 43, is a driver blade resilient material. Passing through suitable openings in ring 45, portion 41 and driver blade 43, in a driver blade retaining pin assembly 44. The piston 38 is sealed into the cylinder by an "O" ring 46 disposed in a suitable space between flange 40 and ring 45.

The upper end of cylinder 20 is formed with an enlarged outwardly extending annular flange portion 47 having means to accommodate a sealing "O" ring 48 in its outer cylindrical surface.

A bumper ring 49 is disposed on the upper surface of flange 22. A lower valve slide ring or sleeve generally designated by numeral 50, comprises a lower portion 51 provided with an inner "O" ring 52, and an outer "O" ring 53, to seal the piston portion 51 against the outside of the cylinder 20 and the inside of a cylindrical portion 11c of the housing portion 11a disposed above flange 22, respectively. Extending upwardly from the radially outer end of ring portion 51, is a cylindrical wall or ring portion 54. The inner surface of ring portion 54 sealingly and slidingly engages "O" ring 48 in flange portion 47 of the cylinder, and an "O" ring 55 on the outer surface of ring portion 54 sealingly and slidingly engages the inside of the housing wall 11c. At the juncture of ring portions 54 and 51, ring portion 54 is formed with a circle of vent openings 57. Housing portion 11a is provided with a vent opening, slit, or series of vent openings 58, which align with openings 57 when the lower slide ring 50 is in its uppermost position, which will appear more clearly in the description of the operation below. The top end of ring portion 54 comprises a first annular control surface 59.

Mounted on the top of housing portion 11a, is a housing lid or cap generally designated by numeral 60. The cap 60 may be secured to the housing by any suitable means, such as screws passing through suitable flanges (not shown) in the lid, and received in openings formed in suitably thickened portions of housing 11.

Cap 60 comprises a top wall 63 having an outer, annular, downwardly depending boss 64, and a central downwardly depending boss 65, thereby defining an annular chamber 66 under top wall 63. Boss 64, on the side of housing 11 toward which assembly 15 extends, is formed with a pair of passages 67; which communicate with the chamber 66, extend down to a pair of similar passages 68 formed in housing portion 11a and are sealingly joined to said passages 68 at the plane of juncture of cap 60 to housing 11. At its lowermost, innermost corner, boss 64 has a thin cylindrical flange 69 positioned inwardly of and extending below the upper annular surface of housing portion 11a. Housing portion 11a, at the side opposite passages 67 and 68, which side may be referred to as the front of machine 10, is formed with a vent slot 70, which is spaced below both the upper surface of housing 11 and the lower end of flange 69.

Joined to cap 60 at boss 65 is a housing lid insert generally designated by numeral 71. Insert 71 comprises a body portion 72 having an upwardly extending cylindrical flange 73 which surrounds a portion of boss 65. Clamped between the upper edge of flange 73, and a suitably formed annular undershoulder of boss 65 is the inner edge of an annular ring-like dampening member 74 in the form of a diaphragm formed of rubber or the like resilient material. Said diaphragm 74 is formed with a circle of openings 75 and its outer peripheral portion overlies the upper surface of an upper valve slide ring 85 to be described hereinafter. Boss 65 and body portion 72 are formed with suitable openings to receive a screw 76 or other suitable means to attach the insert 71 to lid 60. The outer portion of body portion 72 is divided into upper and lower radially extending flanges, 77 and 78 respectively, by an annular slot 79. Lower flange 78 is of somewhat larger diameter than the upper flange 77. At the radially inner end of slot 79, lower flange 78 is formed with a circle of downwardly and inwardly inclined passages 80 communicating with the space above the piston 38. At its upper surface, flange 78 is formed with means to receive a sealing ring 81 which is positioned under the radially outer cylindrical surface of upper flange 77. The radially outer cylindrical surfaces of flanges 77, 78 are formed with means to receive sealing "O" rings 82, 83, respectively. Body portion 72 is formed, at its axially lower surface, radially inwardly of the circle of openings 80, with a recess receiving a permanent magnet assembly 84, which may be held in place by screw 76.

Positioned radially outwardly of flanges 77 and 78, is an upper valve slide ring generally designated by numeral 85. Slide ring 85 comprises an upper ring or sleeve portion 86 and a lower cylindrical ring or sleeve portion 87. Portion 86 has; an inner cylindrical surface which is in sliding, sealing contact with "O" ring 82; an upper annular surface contacted by said outer end of said member 74; and a radially outer cylindrical surface formed with means to receive an "O" ring which is in sliding, sealing contact with the radially inner surface of lid or cap flange 69. An annular undershoulder 90 is formed at the lower end of upper ring portion 86, which is adapted to contact the sealing ring 81 as will appear more clearly hereinafter. At the juncture of ring portion 86 and ring portion 87, slide ring 85 is formed with a circle of openings 91. Ring portion 87 comprises an inner cylindrical surface which is in sliding, sealing contact with "O" ring 83, and an outer cylindrical surface formed with means to receive an "O" ring 92 which in is sliding, sealing contact with surface 11d of housing 11. Ring portion 87 also comprises a bottom annular surface 93 formed to receive a sealing ring 94 which has a portion extending down below said surface. The lowermost surface 95 of sealing ring 94 is of smaller radial extent than surface 93; is positioned between the inner and outer peripheries of the surface 93; comprises a second control surface; and cooperates with the first control surface 59, as will appear more clearly hereinafter. The upper slide ring 85 comprises the lower slide ring portion 87 which has said lower surface 93 and is of the same or less radial extent than said lower slide ring 50; and also comprises the upper slide ring portion 86 of greater radial extension directed inwardly. The radial dimensions of ring portions 87 and 54 are substantially the same.

Slide ring 85 may be replaced by separate ring portions 86 and 87. When the slide rings are in contact as shown in FIG. 1 the area of the bottom surface of lower ring portion 51 plus the area of upper surface 59 outboard of seal ring 94 is greater than the area of the upper surface of upper ring portion 86 plus the area of the portion of surface 93 outboard of said seal ring 94.

Extending rearwardly from the upper rear side of housing portion 11a is a handle 96. Said handle comprises a top wall 96a, side walls 96b, and a bottom wall 102. Inclined downwardly and rearwardly from the lower end of wall 11c is a wall 97 connected at its lower end to wall 11b by a web 97a. Extending rearwardly from wall 97 is a wall 100 which at its rear end is connected by wall 101 to bottom wall 102. A wall 103 connects wall 102 with wall 11b forming a chamber 105. Housing portion 11a between walls 11c and the upper end of housing portion 11a; at about the level of the lower end of lid insert 71, at the rear side thereof, is formed with an inlet slot 98 which communicates with an annular chamber 99 formed in said housing portion. Chamber 105 has side walls enclosing the same. Wall 97 is formed with a through passage 107 connecting chamber 105 with the space 107a beneath slide ring 50.

Walls 96a, 96b, 97, 100, 101, 102 and the rear of housing 11, as well as other walls not shown, define a pressure input chamber, 104. Air under pressure, or any other suitable working fluid, is supplied to chamber 104 by any suitable means (not shown). Chambers 104 and 105 are selectively interconnected by way of a passage 106 formed in wall 100.

Slidably mounted in a bushing 108 mounted in a vertical opening in wall 103, is a valve pin 109 which, when moved upwardly, closes passage 106. Bushing 108 and valve pin 109 are such that when the pin is moved upwardly, any working fluid in chamber 105 is vented to atmosphere around said valve pin, and when said pin is in the FIG. 1 position, chamber 105 is sealed from atmosphere by way of "O" ring 110 on said pin cooperating with the top of the bushing 108.

A trigger blocking pin 111 is provided, and comprises an upper portion 112, a lower portion 113, and a reduced neck portion 114 between the upper and lower portions. Portion 112 is slidably and sealingly mounted in a bushing 115 fixed in an opening in wall 103 by way of an "O" ring 116 carried by said pin portion 112. Lower portion 113 is slidably mounted in a bushing 117 which is mounted in a flange 118 extending rearwardly from the rear side of the housing portion 11a between vertical side flanges 120 which extend from wall 103, downwardly past flange 118, and to a level at or below bottom wall 12. The bottom end of portion 113 is formed with an inverted "V" notch 119.

Pivotally mounted on said flanges 120, between wall 103 and flange 118, as on pivot pin 121, is a trigger 122. Extending from trigger 122, closely adjacent pin 111, are upper and lower trigger movement blocking pins 123 and 124 respectively. Trigger 120 also includes a flange 125 which serves to both actuate pin 109 by contact with the upper surface thereof, and to actuate the machine by providing a place for the operator's finger, on the lower surface thereof.

Flanges 120, below flange 118, are formed with slots 126, in which is guided a transverse, horizontal pin 127. Attached to and extending downwardly and forwardly from outer ends of pin 127 are a pair of connecting members 128 disposed on opposite sides of assembly 15. The lower ends of connecting members 128 comprises a work engaging tip 129 which extends down below the lower end of fastener guide assembly 14 when the machine is not on the work, in which position pin 127 is at the lower end of slots 126, as shown in FIG. 1. The lower ends of members 128 may be slidably connected to assembly 14 in any suitable manner.

The left-hand portion of FIG. 3 shows the position of the valve member after the spreading ring has abutted on the inner wall of the working cylinder with its sealing surface 234, i.e. is in its closing position. In this position, the valve member 232 is not yet deformed. The underside 253 of the valve member is spaced from the inner surface of the bottom 12 of the housing through a distance such that the sealing ring 46 of the piston 38 covers the communication bore 37 between the cylinder inner space and the annular space 24 essentially concentrically surrounding the working cylinder, thus keeping it closed. The annular space 24 additionally communicates with the cylinder inner space below the piston 38 via the bores 36. Sealing of the cylinder is effected by the spreading ring directly below the bores 36.

The right-hand side of FIG. 3 shows the valve member in the deformed condition after having absorbed the residual kinetic energy in the piston at the end of the drive stroke. The underside 253 of the valve member 232, in this position, abuts the inside of the bottom of the housing. The sealed condition of the working cylinder caused by the spreading ring 231 is not affected by the above. Owing to the deformation of the valve member beyond its capability of axial displacement, the communication bore 37 is opened by the sealing ring 46 of the piston 38. Because of this, the compressed air in the cylinder inner space above the piston fills the annular space 24.

When the apparatus is not operative, i.e. when the piston is retracted as in FIG. 1, the control valve is in the position shown in FIGS. 1 and 2. The spreading ring is radially contracted, and the valve member 232 is axially displaced in a direction towards the piston so that the edges 243, 245 of the annular bead 244 at the valve member and the inside of the guiding ring 233, respectively, are abutting each other. An annular gap of relatively small radial extension is provided between the cylinder inner wall and the sealing surface 234 of the spreading ring. After the piston has been biased with compressed air through the actuation of the trigger as will be described below, the blade 43 moves downwards in the working cylinder at a considerable speed in a direction towards the control valve 230. The air displaced by the piston within the working cylinder during its driving stroke flows through the annular gap formed between the sealing surface of the spreading ring 231 and the inner wall of the working cylinder, and through the bores 240 in the guiding ring 233 and the center bore 13 in the bottom 12 of the housing to atmosphere. The flow through the annular gap is large in spite of the minor radial extension of the annular gap because of the relatively large outer diameter thereof, so that no applicable compression of the air displaced by the piston during the drive-in operation occurs. Consequently, the drive-in piston need not perform any push-out work. At the end of the drive-in operation the piston front face 250 abuts the contact surface 249 of the valve member 232. Consequently, the valve member is axially displaced and reaches the position shown in the left-hand side of FIG. 3 after the spreading ring has abutted the cylinder inner wall with its sealing surface 234.

As already described, the sealing ring 46 of the piston 38 then still slightly overlaps the communicating bore 37 to the annular space 24. Owing to the residual kinetic energy still in the piston, the valve member 232 experiences a deformation in which the residual kinetic energy of the piston is dissipated and the underside 253 of the valve member 232 abuts the inside of the housing bottom 12. The communicating bore 37 is opened as a result of this deformation, and the annualr space 24 is biased with compressed air as has been described. The return forces released by the deformation of the valve member, immediately on dissipation of the residual kinetic energy of the piston, effect an axial displacement of the piston 38 such that the sealing ring 251 again closes the communication bore 37. Consequently, the compressed air bias of the annular space results in a momentary pressure impact. This pressure impact directed into the annular space 24 results in a compressed air bias on the front face 250 of the piston, with the compressed air entering the cylinder inner space below the piston 38 from the annular space 24 via the bores 36.

The compressed air from the annular space 24 also exists through the bore 37 in the form of a short pressure impact, whereby the energy needed for the return to the starting position is imposed on the piston. With the return of the piston, the valve member 232 is relieved, the spreading ring 231 contracts radially, and the valve member is returned to its axial starting position of FIG. 2. The annular gap between the sealing surface 234 and the cylinder inner wall is re-established, which causes venting of the cylinder inner space below the piston. It will be noted that the radial contraction of the spreading ring 231 occurs only after the pressure of the compressed air leaving the annular space 24 has dropped, which means that the piston 38 has been partially or entirely returned in a direction towards its starting position before the space below the piston is vented.

The embodiment of FIG. 4 shows a minor modification. The cylinder housing 19' in this embodiment is not provided with a bottom which is cast integrally therewith, but is closed at its front end by a lid 22'. The lid 22' in this embodiment at d essentially takes over the function of the guiding ring 233 in the embodiment of FIGS. 1–3. The outflow of the air displaced by the piston during the drive-in operation in this embodiment takes place via the bores 23', 23" in the lower part of the housing wall and the working cylinder wall, respectively. Otherwise, the mode of operation of the control valve arrangement 30' shown in FIG. 4, is the same as the mode of operation of the first embodiment.

When the machine is pushed down on the work W, the pin 111 will be moved up and the trigger may be actuated since pin 123 may move into the recess or groove around neck portion 114, and pin 124 may move away from portion 113. When the plate 128 is down, as shown, the pin 111 will be down, and the trigger may not be actuated in either direction, since the pins 123 and 124 are on opposite sides of the pivot 121, and they are both in contact with the slidable pin 111.

Assuming the machine is connected to a source of compressed air, so that reservoir chamber 104 receives fluid under pressure, and the trigger has not yet been actuated, chambers 105, 66, and 99, passages 106, 107, 68, and 67, and the space under the ring portion 51 of the lower slide ring 50 are all under pressure because they are all exposed to said reservoir. The two slide rings 50 and 85 will be in the upper position because the effective upward pressure is larger than the effective downward pressure. Passages 80 at this time are vented to atmosphere through slot 79, openings 91, and slot 70. The top of piston 38 is isolated, since control surfaces 59 and 95 are in contact thereby closing the inlet 98 to the cylinder and thereby preventing fluid under pressure from the reservoir from reaching the cylinder. The space below piston 38 is vented to atmosphere through the space between the cylinder wall and the now contracted expanding ring 231.

When the trigger is actuated upwardly, passage 106 is closed; chamber 105, passage 107, and the space 107a below the lower slide ring are vented to atmosphere around pin 109. The effective downward pressure on the upper slide ring then forces the two slide rings to move downwardly together. However, the main piston 38 is still not exposed to pressure since the slide rings move together. This motion continues until the upper slide ring 85 is stopped in its downward movement by contact of annular portion 90 on sealing ring 81, and seals off vent slot 79. Pressure operates on that portion of control surface 59 which is radially outward of sealing surface 95 to move the slide ring 50 dowwardly. As soon as the control surfaces 59 and 95 separate, the entire control surface 59 is exposed to pressure, and the lower slide ring moves down. Upon the separation of the control surfaces 59 and 95, the main piston 38 is exposed to pressure. Before the piston starts to move down, there is metal to metal contact between the piston 38 and the lower end of insert 71 and magnet 84.

The air pressure builds up in the fine grooves (not shown) in the upper surface of the piston and/or the lid insert. Compressed air also seeps into the now sealed passages 80 and slot 79. Due to the magnetic grip between magnet 84 and the top of piston 38, the piston does not start its driving stroke until the pressure has built up sufficiently so that the magnetic grip is broken. Therefore, when the piston 38 does start its driving stroke, it does so with a large initial acceleration.

The driver blade then drives the frontmost fastener in assembly 15, in the well known manner.

As the piston 38 reaches the end of its driving stroke, the top surface of the piston 38 moves below openings 37, and chamber 24 fills with air under pressure. After this time, when the trigger is released, chamber 105 is again sealed from the atmosphere; passage 106 is opened, and chamber 105 and passage 107 become pressurized because of communication with the reservoir 104. The pressure on the bottom of the lower ring portion of the lower slide ring is then greater than the pressure on control surface 59, and the lower slide ring moves up until the control surfaces 59 and 95 meet. Then the effective upward pressure on the slide rings is greater than the effective downward pressure on the slide rings, and the slide rings move up together to the FIG. 1 position, thereby causing passages 80 and slot 79, and the space above piston 38, to be vented to atmosphere, through slot 70.

It will thus be seen that there is provided an apparatus and article in which the several objects of this invention are achieved, and which is well adapted to meet the conditions of practical use.

As possible embodiments might be made of the above invention, and as various changes might be made in the embodiments above set forth, it is to be understood that all matter herein set forth or shown in the accompanying drawings, is to be interpreted as illustrative and not in a limiting sense.

I claim:

1. In combination, a cylinder open at its lower end, a piston within the cylinder adapted to move axially from the upper end of the cylinder toward the lower end of the cylinder, a drive member having its upper end fixed to the piston and extending downwardly therefrom, means to supply fluid under pressure to the upper end of the piston to cause said piston to move downwardly through a driving stroke, a valve at the lower end of the cylinder and below the piston, said valve comprising a valve member formed with an opening slidably receiving said drive member, an elastic sealing ring interposed between said valve member and the inside of said cylinder, said sealing ring being normally positioned in spaced relation to said cylinder to provide a passage therebetween, and means including said valve member, to expand said sealing ring into sealing engagement with the inner surface of said cylinder when said piston moves said valve member axially downwardly at the end of a driving stroke.

2. The combination of claim 1, said valve member comprising resilient material, whereby said valve member may deform to absorb the residual kinetic energy in said piston at the end of a driving stroke.

3. The combination of claim 1, guide means fixed relative to said cylinder and surrounding a portion of said valve member, and means on said valve member cooperable with said guide means to limit upward axial movement of said valve member in said cylinder.

4. The combination of claim 1, said expanding means including a tapered surface on said ring, and a tapered surface adapted to engage the tapered surface on the ring upon said valve member being moved axially downwardly at the end of a driving stroke.

5. The combination of claim 1, said expanding means comprising a pair of oppositely tapered surfaces on said ring, and tapered surfaces on said valve member and on means fixed relative to said cylinder and respectively contacting the tapered surfaces on said ring.

6. The combination of claim 3, said expanding means comprising a pair of oppositely tapered surfaces on said ring, and tapered surfaces on said valve member and said guide means, respectively contacting the tapered surfaces on said ring.

7. The combination of claim 1, and means to exhaust air to the outside of the cylinder from the outside of said ring.

8. The combination of claim 3, said guide means having openings therethrough to bring air from below said ring to below said valve member.

9. The combination of claim 5, said tapered surfaces which contact the tapered surfaces on the ring comprising metal.

10. The combination of claim 1, a housing, said cylinder being mounted within said housing, the outer surface of said cylinder and the inner surface of said housing defining a pressure chamber therebetween, first and second openings in said cylinder connecting the space within said cylinder with said pressure chamber, said piston comprising a sealing means to seal the cylinder space on one side of the piston from the cylinder space on the opposite side of the piston, said first opening being in axially spaced relation below said second opening in the cylinder and above the sealing ring, said piston sealing ring being located at said second opening when said lower valve member has been moved downwardly a distance sufficient to cause said ring to expand into contact with the inner surface of the cylinder, and said piston sealing ring being movable downwardly below the level of said second opening upon said piston thereafter moving further downwardly and compressing said valve member to absorb the residual kinetic energy in the piston.

11. The combination of claim 1, the fit of the elastic sealing ring on said valve member allowing radial play between said ring and valve member when the piston is not contacting said valve member.

12. The combination of claim 3, the fit of the elastic ring on said valve member allowing radial play between said ring and valve member when the piston is not pressing down on said valve member, and the fit of the valve member in the guide means allowing for radial play between said valve member and guide means when said piston is not pressing down on said valve member.

13. The combination of claim 1, said expanding means comprising a fixed guide ring at the lower end of said cylinder, surrounding said valve member, and disposed below said sealing ring, and said valve member having an annular shoulder disposed above said sealing ring, whereby downward pressure on said valve member by said piston will cause said sealing ring to be squeezed between said shoulder and guide ring.

14. The combination of claim 13, said guide ring and shoulder having tapered wedging surfaces, and said sealing ring having wedging surfaces cooperating with the wedging surfaces of said guide ring and shoulder.

15. The combination of claim 14, said wedging surfaces on said guide ring and shoulder comprising surfaces of metal portions of said guide ring and shoulder.

References Cited

UNITED STATES PATENTS

| | | | |
|---|---|---|---|
| 2,938,212 | 5/1960 | Lerner | 277—130 |
| 3,081,742 | 3/1963 | Goldring | 227—130 |
| 3,188,921 | 6/1965 | Bade | 91—399 |
| 3,267,815 | 8/1966 | Ortman | 92—85 |

MARTIN P. SCHWADRON, *Primary Examiner.*

B. L. ADAMS, *Assistant Examiner.*